United States Patent
Singh et al.

(10) Patent No.: US 9,322,478 B2
(45) Date of Patent: Apr. 26, 2016

(54) SEAL SYSTEM AND METHOD FOR ROTARY MACHINE

(75) Inventors: Anurag Singh, Glenville, NY (US); Nestor Hernandez Sanchez, Schenectady, NY (US); James Michael Fogarty, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 59 days.

(21) Appl. No.: 13/563,711

(22) Filed: Jul. 31, 2012

(65) Prior Publication Data
US 2014/0035231 A1 Feb. 6, 2014

(51) Int. Cl.
| F16J 15/43 | (2006.01) |
| F16J 15/44 | (2006.01) |
| F16J 15/447 | (2006.01) |

(52) U.S. Cl.
CPC .......... *F16J 15/442* (2013.01); *F16J 15/43* (2013.01); *F16J 15/4472* (2013.01)

(58) Field of Classification Search
USPC .......... 277/301, 302, 303, 410, 411, 412
See application file for complete search history.

(56) References Cited

U.S. PATENT DOCUMENTS

| 4,252,353 | A | * | 2/1981 | Raj et al. ........................ 277/302 |
| 4,257,735 | A | * | 3/1981 | Bradley et al. ................. 277/303 |
| 4,386,784 | A | * | 6/1983 | Banks ............................ 277/410 |
| 4,407,518 | A | * | 10/1983 | Moskowitz et al. ........... 277/302 |
| 4,455,026 | A | * | 6/1984 | Pinkus et al. .................. 277/301 |
| 4,527,805 | A | * | 7/1985 | Gowda et al. ................. 277/410 |
| 4,630,943 | A | * | 12/1986 | Stahl et al. ..................... 384/133 |
| 5,007,513 | A | * | 4/1991 | Carlson ......................... 192/21.5 |
| 5,064,205 | A | | 11/1991 | Whitford |
| 5,137,286 | A | | 8/1992 | Whitford |
| 5,639,095 | A | * | 6/1997 | Rhode ............................ 277/303 |
| 5,736,800 | A | * | 4/1998 | Iannello et al. ............... 310/90.5 |
| 5,799,951 | A | * | 9/1998 | Anderson et al. ............ 277/301 |
| 5,826,885 | A | * | 10/1998 | Helgeland ..................... 277/302 |
| 5,954,342 | A | * | 9/1999 | Mikhalev et al. ............. 277/410 |
| 6,029,978 | A | * | 2/2000 | Pelstring et al. .............. 277/410 |
| 6,746,019 | B1 | * | 6/2004 | Liebenberg et al. .......... 277/410 |
| 7,129,609 | B1 | * | 10/2006 | Mikhalev et al. ............ 310/90.5 |
| 7,398,974 | B1 | * | 7/2008 | Mikhalev et al. ............. 277/410 |
| 7,748,945 | B2 | * | 7/2010 | Johnson ........................... 415/1 |
| 8,038,155 | B2 | * | 10/2011 | Zheng et al. .................. 277/378 |

(Continued)

FOREIGN PATENT DOCUMENTS

GB 2336408 A 10/1999

OTHER PUBLICATIONS

Search Report and Written Opinion from PCT/US2013/052947 dated Oct. 15, 2013.

*Primary Examiner* — Kristina Fulton
*Assistant Examiner* — Eugene G Byrd
(74) *Attorney, Agent, or Firm* — Fletcher Yoder, P.C.

(57) ABSTRACT

A system includes an electrodynamically suspended seal. The electrodynamically suspended seal includes a first element that includes an electrically conducting material and a second element that includes a magnetic material. At least one of the first and second elements is configured to rotate about an axial axis. The first and second elements are disposed adjacent one another. The rotational movement of at least one of the first and second elements creates a levitation force such that the first and second elements are repelled away from one another. The electrodynamically suspended seal also includes a third element configured to create a counteracting force.

17 Claims, 2 Drawing Sheets

(56) References Cited

U.S. PATENT DOCUMENTS

| | | |
|---|---|---|
| 2008/0136115 A1 | 6/2008 | Johnson |
| 2009/0008881 A1 | 1/2009 | Lee et al. |
| 2010/0078893 A1* | 4/2010 | Turnquist et al. ............. 277/303 |
| 2010/0158674 A1* | 6/2010 | Turnquist et al. .......... 415/173.1 |
| 2011/0182719 A1* | 7/2011 | Deo et al. ................... 415/173.1 |

* cited by examiner

SEAL SYSTEM AND METHOD FOR ROTARY MACHINE

BACKGROUND OF THE INVENTION

The subject matter disclosed herein relates to seal systems, and more particularly, to seal systems for rotary machines such as turbomachines.

In general, turbomachines transfer energy between a rotating element, or rotor, and a fluid. In turbines, energy is transferred from the fluid to the rotor and in compressors, energy is transferred from the rotor to the fluid. For example, a steam turbine extracts thermal energy from pressurized steam to perform work to rotate the rotor or shaft. The steam may flow through one or more turbine stages to generate electrical power or energy for a mechanical drive such as a compressor. As the steam passes through the stages, useful work is produced. However, because of the presence of both rotating and stationary parts in the steam turbine, there will be passages where steam leaks through. Alternatively, there will be a leakage path between the rotating and static parts and that leakage path is affected by the seal configuration and the radial gap between these parts. Additionally, the seals may be subject to wear caused by various conditions, such as startup, transients, upsets, and shutdowns, thus, causing downtime and additional costs to replace the seals. Alternatively, the seals may be designed with increased leakage to extend their life, but with the disadvantage of decreased efficiency and performance of the turbomachine.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes an electrodynamically suspended seal. The electrodynamically suspended seal includes a first element that includes an electrically conducting material and a second element that includes a magnetic material. At least one of the first and second elements is configured to rotate about an axial axis. The first and second elements are disposed adjacent one another. The rotational movement of at least one of the first and second elements creates a levitation force such that the first and second elements are repelled away from one another. The electrodynamically suspended seal also includes a third element configured to create a counteracting force.

In a second embodiment, a system includes a seal controller configured to adjust a separation distance between a rotating element and a sealing element of an electrodynamically suspended seal. The rotating element includes an electrically conducting material configured to rotate about an axial axis. The sealing element is disposed circumferentially surrounding the rotating element. The sealing element includes a magnetic material. The rotational movement of the rotating element creates a levitation force such that the rotating and sealing elements are repelled away from one another. The electrodynamically suspended seal includes a counteracting element configured to create a counteracting force.

In a third embodiment, a method includes surrounding a rotating element with a sealing element of an electrodynamically suspended seal. The sealing element includes a magnetic material. The method also includes rotating the rotating element of the electrodynamically suspended seal about the axial axis. The rotating element includes an electrically conducting material and rotation of the rotating element creates a levitation force such that the rotating and sealing elements are repelled away from one another. The method also includes providing a counteracting element configured to create a counteracting force, and providing an operating distance between the rotating element and the sealing element greater than a threshold by adjusting at least one of the levitation force, or the counteracting force, or any combination thereof.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
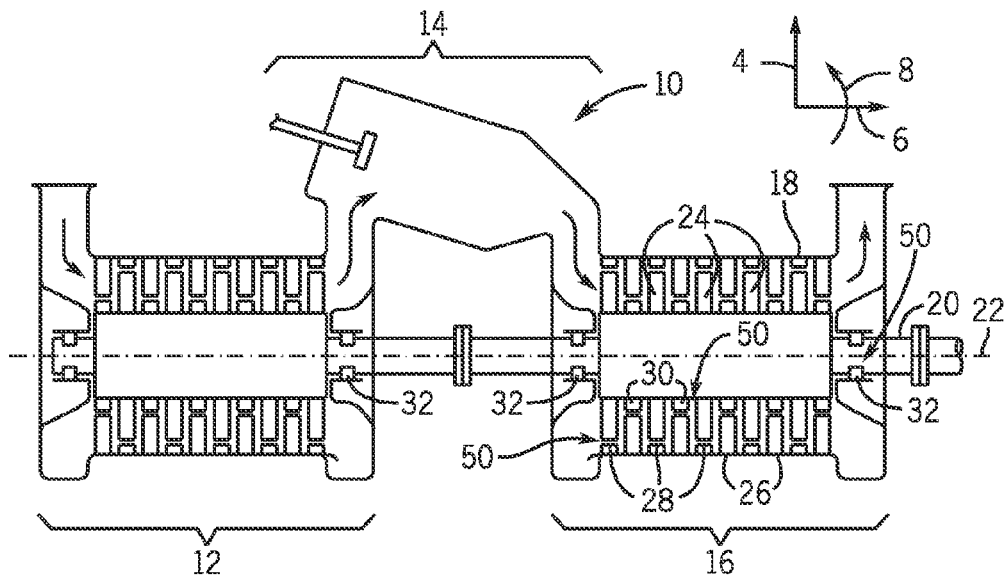
FIG. 1 is an axial cross-sectional view of a turbine system according to an embodiment.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to turbomachines that include seals, and more particularly to electrodynamically suspended seals. For example, the turbomachine may be a gas turbine engine, steam turbine engine, hydro turbine, compressor, or any other type of rotary machine. The electrodynamically suspended seal may be used as a barrier to restrict undesired flow of a fluid through the turbomachine. For example, the electrodynamically suspended seal may be used to reduce leakage of a process fluid from the turbomachine or reduce leakage of the process fluid from one portion of the turbomachine to another by reducing the physical radial gap (clearance) between rotating and sealing parts of the turbomachine. In certain embodiments, the electrodynamically suspended seal may include a first element, a second element, and a third element. The first element may include an electrically conducting material and the second element may include a magnetic material. At least one of the first and second elements rotates about an axial axis of the turbomachine. In addition, the first and second elements are disposed adjacent one another. For example, one of the first and second elements may circumferentially surround the other element. The electrodynamically suspended seal is configured such that the rotational movement of at least one of the first and second elements creates a levitation force such that the first and second elements are repelled away from one another. The third element creates a counteracting force to counteract the levitation force such that the first and second elements maintain their positions relative to each other in spite of the levitation force. The electrodynamically suspended seal may be used to achieve a reduced radial gap (clearance) between the first and second elements than that of prior seals. The leakage reductions achieved using the electrodynamically suspended seal leads to increased performance of the turbomachine compared to that which is possible with prior seals.

Disclosed embodiments of the electrodynamically suspended seal may be able to respond to movement of components of the turbomachine and/or transient conditions of the turbomachine to help block leakage of fluids. In addition, the electrodynamically suspended seal may be able to block leakage without the use of an active control system because the electrodynamic suspension of the seal is naturally stable. In other words, the relationship between the levitation and counteracting forces of the electrodynamic seal helps to maintain the clearance between the first and second elements without having to monitor and/or control the positions of the elements, thereby enabling the first and second elements to be spaced closer to one another. Thus, the electrodynamically suspended seal may provide improved sealing performance compared to prior seals. In addition, by not using an active control system in certain embodiments, the electrodynamically suspended seal may use less energy than actively controlled sealing systems. In other embodiments, a control system may be used with the electrodynamically suspended seal to enhance or control various aspects of the sealing system. For example, the control system may be used to control the electrical current through electromagnets of the electrodynamically suspended seal, thereby adjusting the radial gaps (clearances) between components of the turbomachine during various operating stages, such as startup, normal operation, shutdown, upset conditions, trips, rate (or speed) changes, and so forth. In further embodiments, the control system used with the electrodynamically suspended seal may not be limited to only these functions. In other words, embodiments of the electrodynamically suspended seal may or may not be used with various control systems that may help enhance the performance of the sealing system. Further, the superior sealing performance provided by the electrodynamically suspended seal may enable the turbomachine to operate without secondary sealing systems, thereby improving the efficiency and performance of the turbomachine and reducing capital expenditures associated with operating the turbomachine.

FIG. 1 is a cross-sectional view of an embodiment of a turbine system 10, or turbomachine, which may include a variety of components, some of which are not shown for the sake of simplicity. In the following discussion, reference may be made to a radial direction or axis 4, an axial direction or axis 6, and a circumferential direction or axis 8, relative to a longitudinal axis 22 of the turbine system 10. In the illustrated embodiment, the turbine system 10 includes a compressor section 12, a combustor section 14, and a turbine section 16. The components of the compressor and turbine sections 12 and 16 are similar to one another. For conciseness, only components of the turbine section 16 are labeled in FIG. 1 and discussed below. However, these components may also be present in the compressor section 12. The turbine section 16 includes a stationary housing 18 and a rotating element 20, or rotor, which rotates about the axis 22. Moving blades 24 are attached to the rotating element 20 and stationary blades 26 are attached to the stationary housing 18. The moving blades 24 and stationary blades 26 are arranged alternately in the axial direction 6. There are several possible locations where electrodynamically suspended seal assemblies 50 according to various embodiments may be installed, such as location 28 between a shrouded moving blade 24 and stationary housing 18, location 30 between the rotating element 20 and stationary blade 26, or an end-packing sealing location 32 between rotating element 20 and stationary housing 18. Although the representation of the turbine system 10 shown in FIG. 1 may be similar to that of a gas turbine engine, embodiments of the electrodynamically suspended seal assemblies 50 are not limited only to gas turbine engines. Instead, the electrodynamically suspended seal assembly 50 may be used in any sealing location found in any turbomachine, such as, but not limited to, gas turbine engines, steam turbine engines, hydro turbines, compressors, or any other rotary machines.

The electrodynamically suspended seal assembly 50 described herein includes one or more barriers that restrict undesired flow of a fluid through the seal assembly. Specifically, by restricting undesired flow, each segment of the electrodynamically suspended seal assembly 50 is able to adjust individually to reduce leakage. The seal assembly 50 described herein may be used with any suitable rotary machine, such as, but not limited to, the turbine system 10 of FIG. 1. In the illustrated embodiments, the barriers of the electrodynamically suspended seal assembly 50 may reduce axial leakage between the rotating element 20 and the stationary housing 18. More specifically, in the embodiments described below, the rotating element 20 rotates relative to the stationary housing 18.

Figure 2:
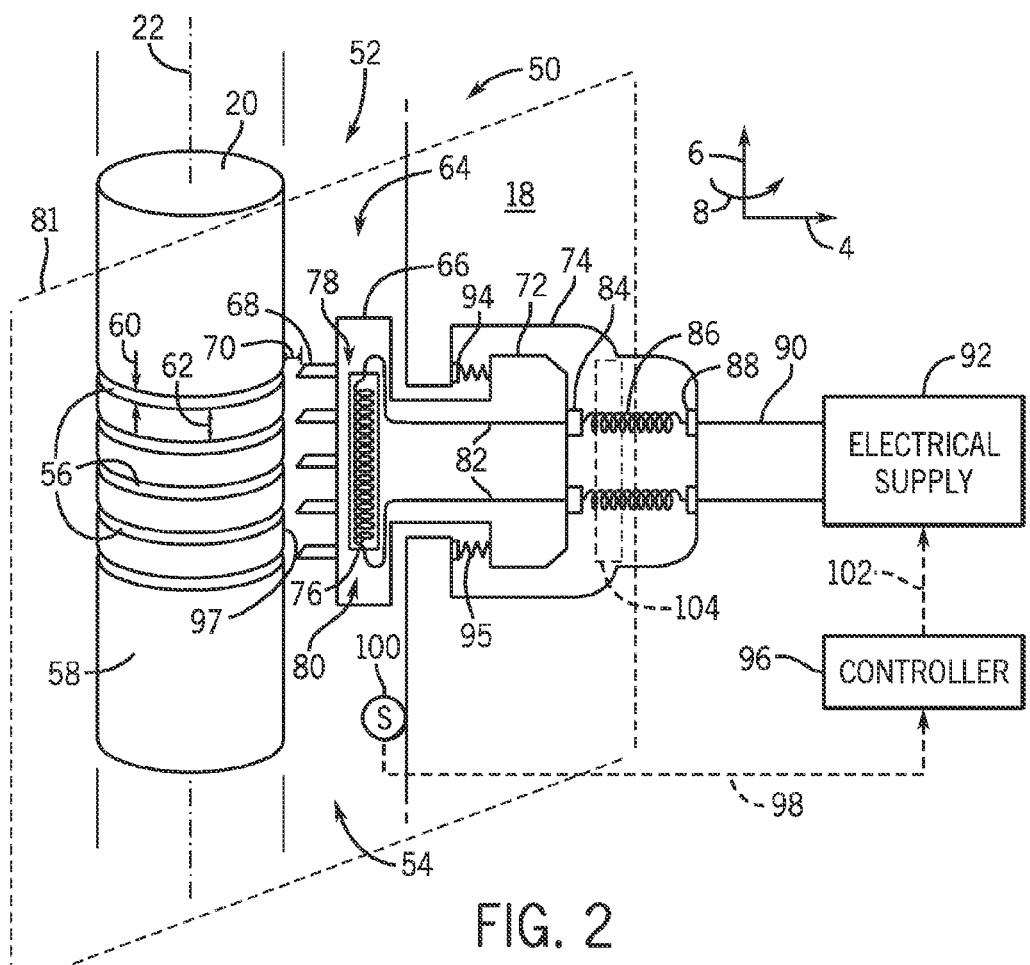
FIG. 2 is a partial perspective view of an electrodynamically suspended seal used for shaft sealing according to an embodiment.

FIG. 2 is a partial perspective view of an embodiment of an electrodynamically suspended seal 50. Air, fuel, steam, water, or other fluids (e.g., liquids and/or gases) enters at an upstream side 52 and exits at a downstream side 54. As shown in FIG. 2, the rotating element 20 rotates about the axis 22. In addition, a first element 56 of the electrodynamically suspended seal 50 is disposed on the rotating element 20. In the illustrated embodiment, the first element 56 is made from an electrically conducting material. Specifically, the electrically conducting material of the first element 56 may be a metal, such as copper, iron, or any other material that allows for electrodynamic suspension (e.g., alloys with superior eddy current induction characteristics). In the illustrated embodiment, the first element 56 includes a plurality of annular strips of the electrically conducting material disposed on a surface of the rotating element 20. The use of copper and similar electrically conducting materials for the first element 56 may be desirable because of their compatibility with the high operating temperatures of the turbine system 10. In further embodiments, the first element 56 may be disposed under the surface of the rotating element 20. In further embodiments, the rotating element 20 may be made partially or entirely from the electrically conducting material. As shown in FIG. 2, each of the plurality of strips of the first element 56 has a width 60 and is separated from the other strips by a separation distance 62.

As shown in FIG. 2, a second element 64 of the electrodynamically suspended seal 50 may be located adjacent to the first element 56. The second element 64 of the electrodynamically suspended seal 50 includes a magnetic material. Specifically the second element 64 may include an electromagnet or a permanent magnet. The electromagnet may include a ferromagnetic core surrounded by a coil carrying a flow of electric current and the permanent magnet may be made from a magnetized material. The second element 64 may include an inner portion 66 disposed between the rotating element 20 and the stationary housing 18. Attached to the inner portion 66 may be a plurality of barriers 68 configured to block axial flow of fluids through the electrodynamically suspended seal 50. Examples of barriers 68 include, but are not limited to, brushes, compliant plates, leaves, fingers, teeth, shims, wires, and so forth. Each of the barriers 68 may be separated from the rotating element 20 by a separation distance 70 (e.g., a radial 4 clearance). Reducing the separation distance 70 may help reduce axial flow (e.g., leakage) through the electrodynamically suspended seal 50. During operation of the turbine system 10, the electrodynamically suspended seal 50 may help maintain the separation distance 70 below a threshold, which may be between approximately 0.025 to 0.4 mm, 0.075 to 0.25 mm, or 0.13 to 0.18 mm. In certain embodiments, the electrodynamically suspended seal 50 may help maintain the separation distance 70 below approximately 0.13 mm. The separation distance 70 maintained by the electrodynamically suspended seal 50 may be less than what is obtainable using prior seal systems for reasons explained in detail below.

The second element 64 may also include an outer portion 72 disposed in an opening 74 formed in the stationary housing 18. The outer portion 72 may include components of the electrodynamically suspended seal 50 located further away from the rotating element 20. For example, an electromagnet 76 may be disposed in the inner portion 66. The electromagnet 76 may include a north pole 78 and a south pole 80. In other embodiments, the positions of the north and south poles 76 and 78 may be switched. In the illustrated embodiment, a plane 81 of a magnetic flux of the electromagnet 76 is parallel to the axial axis 6 and the axis 22 of the rotating element 20. In other embodiments, the levitation force between the first and second elements 56 and 64 may be produced even if the plane 81 of the magnetic flux of the electromagnet 76 is not be parallel to the axial axis 6 and the axis 22. As shown in FIG. 2, wires 82 may be coupled to electromagnet 76 in the inner portion 66 and routed into the outer portion 72. Specifically, the wires 82 may be connected to terminals 84 located in the outer portion 72. Flexible wires 86 may be used to convey electrical power from connectors 88 disposed in the opening 74 to the connectors 84 disposed on the outer portion 72. In certain embodiments, the flexible wires 86 may be arranged as coils to enable the outer portion 72 to move in the radial direction 6 toward or away from the rotating element 20. External wires 90 may be used to couple the connectors 88 to an electrical supply 92 that provides electrical power for the electromagnet 76. The components of the outer portion 72 and the electrical supply 92 may be located further away from high temperatures of the turbine system 10 and thus, may be made from different materials than the inner portion 66 or the first element 56.

The electrodynamically suspended seal 50 operates based on the principle of electrodynamic suspension. As shown in FIG. 2, the first element 56 of the rotating element 20 rotates with respect to the second element 64 (e.g., the electromagnet 76). In other embodiments, the second element 64 may rotate with respect to the first element 56 or both the first and second elements 56 and 64 may rotate with respect to one another. The relative rotational movement between the first and second elements 56 and 64 creates a levitation force such that the first and second elements 56 and 64 are repelled away from one another. For example, in the illustrated embodiment, when the rotating element 20 (e.g., first element 56) is rotating, it is moving in the magnetic field of the electromagnet (e.g., second element 64). The rotation of the rotating element 20 creates eddy currents in a direction that counters any change in the magnetic field (e.g., caused by a displacement) according to Lenz's law. The eddy currents cause a magnetic field that is oriented opposite from the magnetic field of the electromagnet 76. In other words, the first element 56 effectively creates a magnetic mirror of the electromagnet 76. When the rotating element 20 is rotating at a certain speed, the changing magnetic field in the first element 56 induces a magnetic field that opposes the electromagnet 76. Thus, any change in the rotational speed of the rotating element 20 or distance between the first and second elements 56 and 64 affects the levitation force.

The electrodynamically suspended seal 50 also includes a third element disposed in the stationary housing 18 that creates a counteracting force to counteract the levitation force (e.g., the third element may repel or attract the second element 64). The third element may be a spring 95 or a magnet 104, which may be a permanent magnet or an electromagnet. For example, the spring 95 may help bias the outer portion 72 away from the rotating element 20. As described, the naturally stable arrangement of the electrodynamically suspended seal 50 achieved by balancing the levitation and counteracting forces does not use an active control system, thereby reducing the capital expenditure cost, operating cost, and complexity of the seal 50. As described below, a controller may be used to change the current through the electromagnet 76 or the electromagnet 104, thereby changing the normal separation distance 70. The controller may or may not be used to constantly change or adjust the separation distance 70 during normal operation of the turbine system 10. For example, the controller may be used to adjust the separation distance 70 during transient conditions (e.g., a larger separation distance 70 during startup, upset, or shutdown). As shown in FIG. 2, the electromagnet 104 may be disposed between the outer portion 72 and the connectors 88 in the opening 74 of the stationary housing 18.

When the electrodynamically suspended seal 50 is operating, displacement of the rotating element 20 from a normal position may cause the separation distance 70 to decrease for a short period. This displacement may be counteracted by the levitation force between the first and second elements 56 and 64 that cause the second element 64 to move away from the rotating element 20, thereby returning the separation distance 70 to its normal value. Similarly, if the rotating element 20 moves away from the second element 64, the separation distance 70 may increase for a short period. The counteracting force of the third element (e.g., spring 95 or magnet 104) may then cause the second element 64 to move toward the rotating element, thereby returning the separation distance 70 to its normal value. Thus, the electrodynamically suspended seal 50 may be described as self-adjusting. In other words, the electrodynamically suspended seal 50 helps to maintain a desired separation distance 70 without outside input or control.

Several variables may be used to adjust the normal separation distance 70 of the electrodynamically suspended seal 50. For example, the amount of the electrically conducting material in the first element 56 (e.g., width 60, spacing 62, or thickness) or the magnetic strength of the second element 64 may be varied to adjust the levitation force, and thereby, the normal separation distance 70. For example, if the second element 64 is a permanent magnet, a magnet with a different magnetic strength may be used to adjust the normal separation distance 70. Alternatively, if the electromagnet 76 is used for the second element 64, the electric current flowing through its coils may be varied to adjust the normal separation distance 70. In addition, the speed of the rotating element 20 may affect the separation distance 70. For example, the separation distance 70 may decrease at slower speeds and increase at higher speeds. Thus, a controller, described in detail below, may be used to counteract this tendency. Further, the particular magnet used as the permanent magnet or the particular current flowing through the electromagnet 76 may be selected based on the magnetic field strength that corresponds to a desired separation distance 70 for a particular operating speed of the rotating element 20. In addition, the third element (e.g., spring 95 or magnet 104) may be varied to adjust the counteracting force, and thereby, the normal separation distance 70. For example, if the third element is the spring 95, the materials or amount of compression of the spring 95 may be varied. If the third element is a permanent magnet 104, a magnet with a different magnetic strength may be used to adjust the normal separation distance 70. Alternatively, if the third element is an electromagnet 104, the electric current flowing through its coils may be varied to adjust the normal separation distance 70.

In certain embodiments, the electrodynamically suspended seal 50 may include one or more mechanical stops 94 configured to help block the barriers 68 from contacting the rotating element 20. As discussed above, electrodynamic suspension involves relative rotary motion of the first and second elements 56 and 74. Thus, during startup and shutdown situations where the rotating element 20 is not rotating at full speed, the levitation force of the electrodynamic suspended seal 50 may be less. Thus, the mechanical stops 94 may be used during these situations to help maintain the separation distance 70. In other words, the mechanical stops 94 may act as a fail-safe if the electrodynamically suspended seal 50 stops functioning for any reason. For example, the mechanical stops 94 may be disposed between the outer portion 72 and the stationary housing 18. Thus, the location of the mechanical stop 94 may help block the outer portion 72 from moving in the radial direction 4 toward the rotating element 20 more than the mechanical stop 94 allows. In further embodiments, an abradable material 97 may be disposed between the first and second elements 56 and 64 (e.g., disposed on an external surface of the first element 56). The abradable material 97 may abrade upon contact of the first element 56 with the second element 64, which may occur if the electrodynamically suspended seal 50 stops functioning for any reason.

In certain embodiments, a controller 96 may be used to control the electromagnet 76 or the electromagnet 104 of the third element via the electrical power supplied by the electrical supply 92. Specifically, the controller 96 may be used to adjust the separation distance 70 between the rotating element 20 and the barriers 68 of the second element 64. For example, the controller 96 may receive a signal 98 from a sensor 100 (e.g., a proximity sensor) disposed between the rotating element 20 and the stationary housing 18. The sensor 100 may provide an indication of the separation distance 70. To adjust the separation distance 70, the controller 96 may send an output signal 102 to the electrical supply 92 to adjust the magnetic flux of the electromagnet 76. For example, to increase the separation distance 70 (e.g., above a threshold to help prevent undesired contact between components), the controller 96 may be used to increase the electrical power supplied to the electromagnet 76 to increase the levitation force and/or decrease the electrical power supplied to the electromagnet 104 to decrease the counteracting force. In other embodiments, to decrease the separation distance 70 (e.g., below a threshold to help reduce leakage), the controller 96 may be used to decrease the electrical power supplied to the electromagnet 76 to decrease the levitation force and/or increase the electrical power supplied to the electromagnet 104 to increase the counteracting force. The controller 96 may or may not be used to adjust the electromagnet 76 during operation of the turbine system 10. For example, the electrodynamically suspended seal 50 may constantly maintain the separation distance 70 in response to transients of the turbine system 10, and the controller 96 may be used to adjust the normal separation distance 70 maintained by the electrodynamically suspended seal 50. For example, the controller 96 may specify a larger separation distance 70 during start up of the turbine system 10, and then reduce the separation system 70 once the turbine system 10 reaches a steady state operation. The controller 96 may also adjust the separation distance 70 via the electromagnet 76 or the electromagnet 104 during normal operation to achieve a different amount of leakage or efficiency. Again, in certain embodiments, the electrodynamically suspended seal 50 constantly maintains the separation distance 70 as the turbine system 10 moves from startup to normal operation.

Figure 3:
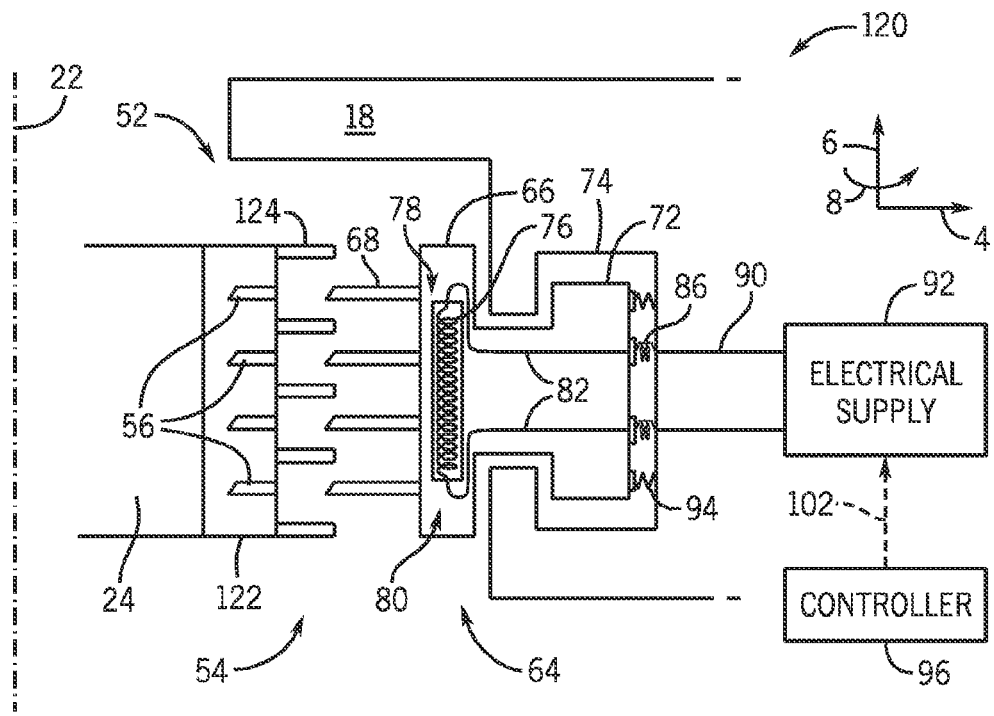
FIG. 3 is a partial perspective view of an electrodynamically suspended seal used for tip sealing according to an embodiment.

FIG. 3 is a partial perspective view of an electrodynamically suspended seal 120 that may be used for tip sealing. As shown in FIG. 3, a moving blade 24 (e.g., a blade of the compressor section 12 or a blade of the turbine section 16) may rotate about the axis 22 of the turbine system 10. In certain embodiments, the moving blades 24 may include a bucket tip cover 122 to cover the edges of the moving blades 24. In the illustrated embodiment, the bucket tip cover 122 includes the first element 56. Specifically, the bucket tip cover 122 includes strips of the electrically conducting material as the first element 56. In other embodiments, the entire bucket tip cover 122 may be made from the electrically conducting material. As shown in FIG. 3, a plurality of tips 124 (e.g., teeth or other types of barriers) may be coupled to the bucket tip cover 122 to help block axial flow of fluid through the turbine system 10. The barriers 68 of the second element 64 may be disposed in the gaps between the tips 124 in a staggered arrangement to help provide a tortuous path for the fluid flowing through the turbine system 10. In addition, the barriers 68 may be located directly opposite from each of the strips of the second element 56. In other respects, the electrodynamically suspended seal 120 is similar to that shown in FIG. 2.

Figures 4, 5:
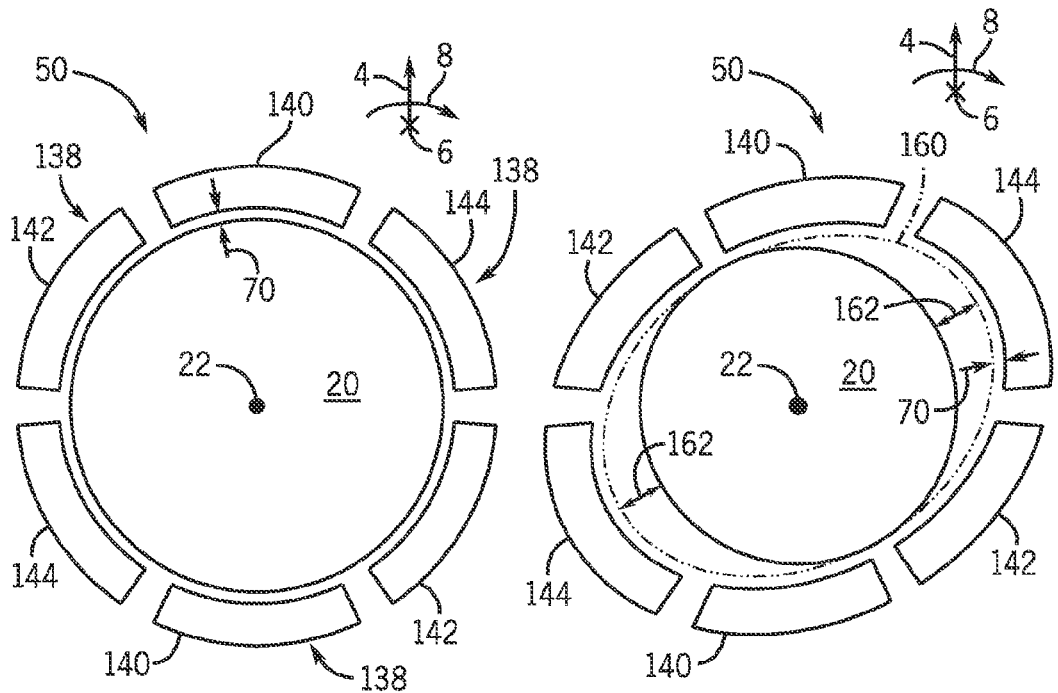
FIG. 4 is a radial cross-sectional view of an electrodynamically suspended seal according to an embodiment.
FIG. 5 is a radial cross-sectional view of an electrodynamically suspended seal during a transient condition according to an embodiment.

FIG. 4 is an axial cross-sectional view of an embodiment of the electrodynamically suspended seal 50. As shown in FIG. 4, the electrodynamically suspended seal 50 surrounds the rotating element 20. In addition, the electrodynamically suspended seal 50 includes a plurality of segments 138 surrounding rotating element 20. The use of segments 138 with the electrodynamically suspended seal 50 may help the seal 50 better address variations circumferentially 8 around the axis 22, as described below. For example, the electrodynamically suspended seal 50 may include a first pair 140 of segments 138, a second pair 142 of segments 138, and a third pair 144 of segments 138. As shown in FIG. 4, the segments 138 of each of the pairs 140, 142, and 144 are located diametrically opposite from one another about the axis 22. The magnetic strength of each of the pairs 140, 142, and 144 may be approximately the same. In further embodiments, the number of segments 138 in the electrodynamically suspended seal 50 may be more or less than that shown in FIG. 4. Each of the pairs 140, 142, and 144 of segments 138 may be controlled independently from one another. In other words, each of the pairs 140, 142, and 144 may be synchronized. In other embodiments, each of the segments 138 of the electrodynamically suspended seal 50 may operate independently from all the other segments 138 of the seal 50.

FIG. 5 is an axial cross-sectional view of an embodiment of electrodynamically suspended seal 50 operating during a condition (e.g., a startup, shutdown, or transient condition) of the turbine system 10. Specifically, the rotating element 20 may rotate in such a way as to generate an ellipsoid shape 160 separated from the normal position of the rotating element 20 by a separation distance 162. Such an ellipsoid shape 160 of the movement of the rotating element 20 may occur during certain transient conditions of the turbine system 10. As shown in FIG. 5, each of the pairs of segments 140, 142, and 144 may independently move to maintain the separation distance 70 between the ellipsoid shape 160 and the electrodynamically suspended seal 50. For example, the third pair 144 may move further away from the normal position of the rotating element 20 in response to the ellipsoid shape 160. In contrast, the first and second pairs 140 and 142 may move less than the third pair 144.

As described above, certain embodiments of the electrodynamically suspended seal 50 include a first element 56 and a second element 64. The first element 56 includes an electrical conducting material and the second element 64 includes a magnetic material. In certain embodiments, the first element 56 may be disposed on the rotating element 20 of the turbine system 10 and the second element 64 may be disposed in the stationary housing 18. In other embodiments, the first element 56 may be disposed in the stationary housing 18 and the second element 64 may be disposed on the rotating element 20. The electrodynamically suspended seal 50 is configured such that relative rotation of the first and second elements 56 and 64 create the levitation force such that the first and second elements 56 and 64 are repelled away from one another. The levitation force is counteracted by the counteracting force of the third element (e.g., spring 95 or magnet 104) such that the electrodynamically suspended seal 50 maintains the separation distance between the first and second elements 56 and 64. Thus, the electrodynamically suspended seal 50 is self-adjusting. In certain embodiments, the controller 96 may be used to adjust the separation distance 70 between the rotating element 20 and the barriers 68 of the second element 64. However, the electrodynamically suspended seal 50 operates continuously to maintain the separation distance 70 with or without any active control by the controller 96. Thus, the electrodynamically suspended seal 50 may use less electrical power than prior actively controlled sealed systems. In addition, the electrodynamically suspended seal 50 may be able to maintain a smaller separation distance 70 than prior seal systems because of its naturally stable arrangement that responds immediately to displacements without use of an active control system. Therefore, use of the electrodynamically suspended seal 50 in the turbine system 10 (or other rotary machine) may help improve the efficiency, reduce maintenance costs, and reduce capital expenditure costs associated with the turbine system 10 (or other rotary machine).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   an electrodynamically suspended seal, comprising:
      a first element comprising an electrically conducting material;
      a second element comprising a magnet having a second magnetic field, wherein the first element is configured to couple to a rotating element and rotate about an axial axis, the first and second elements are disposed adjacent one another, and a rotational movement of the first element relative to the second element through the second magnetic field is configured to generate eddy currents in the first element, the eddy currents generate a first magnetic field from the electrically conducting material, and the first magnetic field interacts with the second magnetic field to create a levitation force such that the first and second elements are magnetically repelled away from one another during the rotational movement of the first element;
      a leakage path disposed between the first element and the second element; and
      a third element configured to create a counteracting force to counteract the levitation force.

2. The system of claim 1, wherein the second element comprises a permanent magnet.

3. The system of claim 2, wherein the levitation force between the first and second elements is maintained by a magnetic strength of the permanent magnet.

4. The system of claim 1, wherein the third element comprises a spring, an electromagnet, or a permanent magnet.

5. The system of claim 1, wherein a separation distance between the first element and the second element is maintained less than approximately 0.13 mm by adjusting at least one of the levitation force, the counteracting force, or any combination thereof.

6. The system of claim 1, wherein the first element comprises annular strips of the electrically conducting material.

7. The system of claim 1, comprising an abradable material disposed between the first and second elements, wherein the abradable material is configured to abrade upon contact of the first element with the second element.

8. The system of claim 1, comprising a mechanical stop configured to block contact of the first element with the second element.

9. The system of claim 1, comprising a turbomachine having the rotating element, wherein the electrodynamically suspended seal is disposed in the turbomachine.

10. A system, comprising:
    a seal controller configured to adjust a separation distance between a rotating element and a sealing element of an electrodynamically suspended seal, wherein an electrically conducting material is coupled to and rotates with the rotating element, the rotating element is configured to rotate about an axial axis, the sealing element is disposed circumferentially surrounding the rotating element, the sealing element comprises a magnetic material having a second magnetic field at least during operation of the system, a rotational movement of the rotating element relative to the sealing element through the second magnetic field is configured to generate eddy currents in the rotating element, the eddy currents generate a first magnetic field from the electrically conducting material, and the first magnetic field interacts with the second magnetic field to create a levitation force such that the rotating and sealing elements are magnetically repelled away from one another, and the electrodynamically suspended seal comprises a counteracting element configured to create a counteracting force to counteract the levitation force.

11. The system of claim 10, comprising the electrodynamically suspended seal.

12. The system of claim 10, comprising the rotating element, the sealing element, and the counteracting element.

13. The system of claim 10, comprising a turbomachine having the rotating element and the sealing element.

14. The system of claim 10, wherein the seal controller is configured to provide a first electrical current through a first electromagnet of the sealing element or a second electrical current through a second electromagnet of the counteracting element to adjust the separation distance.

15. The system of claim 14, wherein the seal controller is configured to increase the first electrical current to increase the levitation force or decrease the second electrical current to decrease the counteracting force in order to move the rotating and sealing elements apart from one another if the separation distance decreases below a threshold.

16. The system of claim 10, comprising a proximity sensor configured to detect the separation distance and generate a signal indicative of the separation distance to the seal controller, wherein the proximity sensor is disposed between the rotating and sealing elements.

17. The system of claim 10, wherein the sealing element comprises a plurality of sealing element pairs, each of the sealing element pairs comprising a first sealing element and a second sealing element disposed opposite from one another about the axial axis, and the seal controller is configured to adjust the separation distance between the rotating element and each of the plurality of sealing element pairs independently from one another.

* * * * *